July 4, 1967 — P. H. SAVET — 3,329,026
ACCELEROMETER
Filed Aug. 22, 1956

INVENTOR.
PAUL H. SAVET
BY Raymond A. Paquin
ATTORNEY.

United States Patent Office 3,329,026
Patented July 4, 1967

3,329,026
ACCELEROMETER
Paul H. Savet, Westbury, N.Y., assignor to American Bosch Arma Corporation, a corporation of New York
Filed Aug. 22, 1956, Ser. No. 605,553
4 Claims. (Cl. 73—517)

The present invention relates to vibrating string accelerometers and has particular reference to mechanical decoupling means therein.

In a vibrating string accelerometer of the type described in copending U.S. patent application Ser. No. 586,615, a pair of mutually aligned wires are joined at a central weight and are stretched taut across an open frame. The wires are kept in vibration at their natural frequencies by a pair of oscillators, and the natural frequency, being dependent upon the tension, is also dependent upon the acceleration of the frame in the direction of the wires as the acceleration force acts on the central mass to vary the tension of each wire accordingly. The beat frequency is used as a measure of the acceleration.

It is imperative in this type of device that the vibration of one wire is not communicated to the other wire through the central weight, and various decoupling means have been tried. In one case two separate weights are joined by a relatively stiff axial member and supported in the frame by symmetrically placed lateral extension tapes. In another case tapes are used for the vibrating members and their planes of natural vibrations are at right angles to one another so that the vibration of one tape will not affect the other. Although the prior decoupling means are not altogether unsatisfactory, the present device is an improvement which permits easy adjustment and which requires only half the number of lateral suspension members for equal accuracy.

The present invention contemplates a central weight with opposite faces which contain points which are centers of percussion for each other. It is known that if an impulsive force is applied to the center of percussion in a direction perpendicular to a plane containing the center of gravity and the axis of rotation of the body, there will be no reaction at the axis of rotation. Therefore, when the vibrating wires are secured to the points which are mutual centers of percussion, the vibrating strings will be effectively decoupled.

For a more complete understanding of the invention reference may be had to the accompanying drawings in which.

Figure 1:
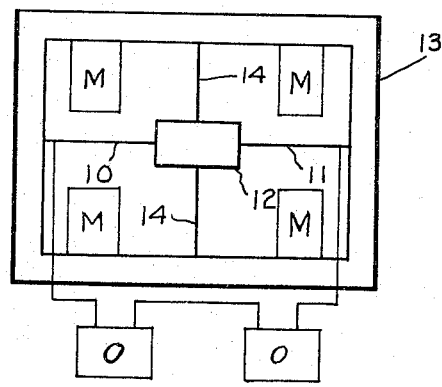
FIG. 1 shows the type of transducer to which the invention is applied.

Referring now to FIG. 1, there is shown a transducer of the type employed in the accelerometers of the previously referred to patent applications. In this transducer a pair of coaxial wires 10, 11 are connected to a central weight 12 and are stretched under tension across an open frame 13. The weight 12 is also supported in the frame 13 by the symmetrically placed laterally extending suspension tapes 14. In operation, the wires 10, 11 are maintained in vibration at their natural frequency by electronic means comprising magnets M and electronic oscillators O electrically connected across the wires 10 and 11 as shown in FIG. 1. Upon acceleration of the frame the wire tensions are changed and the natural frequencies are changed accordingly. The beat frequency of the wire vibration is a measure of the frame acceleration. For accuracy in this type of device, it is imperative that the two wires 10, 11 are completely decoupled mechanically, i.e., none of the vibration of either wire will be communicated to the other wire through the central weight 12.

Figure 2:
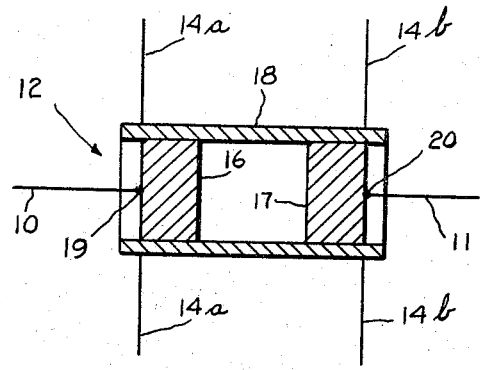
FIG. 2 shows an enlarged cross sectional view of a particular preferred embodiment of the central weight.

FIG. 2 shows an enlarged cross sectional view of a preferred embodiment of the present invention, in which the weight 12 comprises a pair of heavy plugs 16 and 17 securely held near opposite ends of the thin cylinder 18. The wires 10 and 11 are attached to the exact centers 19, 20 of the outer faces of the respective plugs 16 and 17. The physical dimensions of the weight 12 are such that the point 19 is a center of percussion with respect to point 20, and the point 20 is a center of percussion with respect to point 19.

The ends of the cylinder 18 preferably protrude beyond the outer faces of the plugs 16 and 17 in order to provide means for accurate adjustment of the centers of percussion. This adjustment can be made by filing away part of the cylinder 18 in order to make the radius of gyration of the weight 12 such that the following relationship, which defines the center of percussion, is met.

Thus:

$$b = \frac{k^2}{a}$$

Where $b$ is the distance between the point 19 and the center of gravity of weight 12, $k$ is the radius of gyration of the weight 12 about a transverse axis, that is, an axis perpendicular to the longitudinal axis of the weight, through the center of gravity, and $a$ is the distance from the center of gravity of the weight 12 to point 20. If the relationship is satisfied for one of the points, it will be satisfied for both points. It will be seen, therefore, that each point 19 and 20 is a center of percussion when the other point 20 or 19 respectively is on the axis of rotation. Thus, it can be said that the points 19 and 20 are mutual centers of percussion.

It should be noted that the weight 12 is preferably suspended with two sets of laterally extending tapes, 14a and 14b, one set of which forms a plane containing one center of percussion 19 and the other set of which 14b forms a plane containing the other center of percussion 20. It is possible, also, to suspend the weight 12 with one set of tapes, but for accuracy this set must form a plane containing the center of gravity of the weight 12 and this may pose a practical problem of assembly.

Figures 3, 4:
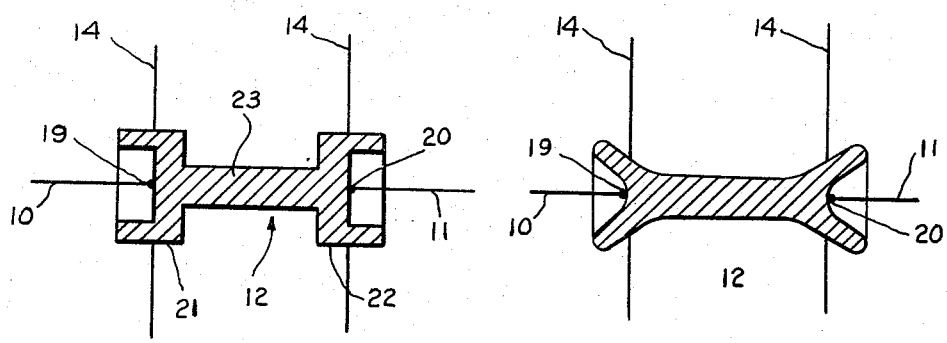
FIG. 3 shows another possible embodiment of the central weight.
FIG. 4 shows a modified version of FIG. 3.

The weight 12 may be made in a number of shapes, all coming under the concept of the present invention, and several of which are suggested by the sectional views in FIGS. 3 and 4. FIG. 3 shows a pair of cup shaped bodies 21, 22 which are attached to the ends of a rigid bar on shaft 23. FIG. 4 shows a cross section which may be described as "bone-shaped."

In each of these weights, as well as in any other suitable weight which may be designed for the purpose here described, it is essential that the points of attachment 19, 20 are internal of the extreme ends of the weight 12. In other words, the weight overhangs, or protrudes beyond the points of suspension. Also, it is necessary that the mass of the weight is concentrated close to the ends of the weight rather than at the center of gravity. The weight 12, must of course, be symmetrical in all directions about the center of gravity.

The present invention is not to be limited to the embodiments herein described, but is to be interpreted in accordance with the appended claims.

I claim:

1. In a device of the character described, a frame, a weight suspended in said frame by a plurality of suspension members and a plurality of tension members, said tension members each being connected to said weight adjacent one of the ends thereof, said weight having a recess portion adjacent each end thereof, said tension members being attached to said weight at points in said recesses which are mutual centers of percussion.

2. In a device of the character described, a frame, a weight suspended in said frame by a plurality of suspension members and a plurality of vibrating tension members, said tension members each being connected to said weight adjacent one of the ends thereof, said weight having a recess portion adjacent each end thereof, said vibrating tension members being attached to said weight at points in said recesses which are mutual centers of percussion and means for vibrating said tension members.

3. In a device of the character described, a frame, a weight suspended in said frame by a plurality of suspension members and a plurality of tension members, said tension members each being connected to said weight adjacent one of the ends thereof, said tension members being attached to said weight at points which are mutual centers of percussion, the outer edges of said weight extending beyond the points of attachment of said tension members to said weight.

4. In a device of the character described, a frame, a weight suspended in said frame by a plurality of suspension members and a plurality of vibrating tension members, said tension members each being connected to said weight adjacent one of the ends thereof, said vibrating tension members being attached to opposite ends of said weight at points which are mutual centers of percussion, the outer edges of said weight extending beyond the points of attachment of said vibrating tension members to said weight and means for vibrating said tension members.

References Cited
UNITED STATES PATENTS

| | | | |
|---|---|---|---|
| 2,588,295 | 3/1952 | Rowe | 84—1.15 |
| 2,725,492 | 11/1955 | Allan | 264—1 X |

FOREIGN PATENTS 729,894  12/1942  Germany.

OTHER REFERENCES

Analytical Mechanics for Engineers, Seely and Ensign, published by John Wiley and Sons, Inc., 1927. Pages 363–365 are most pertinent.

JAMES J. GILL, *Acting Primary Examiner.*

A. BLUM, SAMUEL BOYD, A. M. HORTON,
*Examiners.*

W. J. CURRAN, *Assistant Examiner.*